Patented May 5, 1953

2,637,535

UNITED STATES PATENT OFFICE 2,637,535

PROCESS FOR MANUFACTURING PAINTS AND COLORED PLASTICS

Michael Henry Miller Arnold, Birmingham, England, assignor to Postans Limited, Birmingham, England, a corporation of Great Britain No Drawing. Application April 10, 1951, Serial No. 220,352. In Great Britain May 6, 1950

5 Claims. (Cl. 259—1)

This invention has reference to a new or improved process for manufacturing paints and coloured plastics.

In the manufacture of paints, printing inks and similar products it has already been proposed to accomplish the dispersion of the pigment in the liquid vehicle by introducing initially dispersed solids and initially dispersed liquids simultaneously into a high intensity compressional wave field existing preferably in a gaseous medium so that the high degree of agitation produced by the compressional wave results in such an intimacy of mixture of the solid and liquid particles that a wetting of the individual solid particles is obtained.

Alternatively it has been suggested to maintain the liquid in its fluid state and to blow the said particles which are to be mixed with the liquid into the liquid whilst the liquid is in a state of intense compressional wave vibration.

Further, it has been proposed in order to facilitate the mixing of paint to supply to a retailer with cans containing only a base such as a white paint, and separate containers for powdered colour mediums, so that when paint of a required tint is ordered it is only necessary to select the powdered medium required to give the desired tint or shade and to place the colour medium within the can containing the white paint base by removing a special auxiliary lid and then effecting the admixture of the colour medium and the base paint by mechanical agitation.

According to the invention the new or improved process for manufacturing paints and coloured plastics resides in the steps of adding powdered pigment to a carrier liquid of low viscosity, or vice versa, then effecting a dispersion of the pigment in the carrier liquid and subsequently mixing the pigment carrier liquid preparation with a more viscous liquid or with a plastic forming syrup or the like of relatively high viscosity.

According to the invention also the new or improved process of manufacturing paints and coloured plastics resides in the steps of adding powdered pigment to a body of carrier liquid of low viscosity or vice versa, subjecting the liquid and additive to ultrasonic vibrations to ensure a uniform dispersion of the pigment in the carrier liquid, reducing the product to a desired solids content by evaporation, then adding the preparation aforesaid in the required proportion to the liquid which is to constitute the body of the paint or to the syrup or the like which is to produce the required plastic and which liquids, syrups or the like are of relatively high viscosity and subsequently effecting a mixing of the liquid pigment preparation of relatively low viscosity and the liquid, syrup or the like of relatively high viscosity.

The invention also resides in a paint or plastic produced by the processes aforesaid.

An embodiment of the invention will first be described in its application to the manufacture of paint.

According to the said embodiment of the invention the pigment in finely powdered form is added to a carrier liquid of relatively low viscosity but conveniently of high volatility, for example xylene or white spirit.

The liquid and additive are then subjected to ultrasonic vibrations derived conveniently from a transducer of the magneto-striction type or in the form of a Galton whistle.

The subjection of the liquid to ultrasonic vibrations results in the production of heat and use is made of this heat which otherwise would be wasted, to evaporate part of the carrier liquid so as to produce a preparation having a desired solids concentration. Since the amount of heat so produced depends principally upon the duration and intensity of the ultrasonic vibrations, the heat developed may be either insufficient or excessive for producing the required result and hence in the former case supplemental heat may have to be applied whilst in the latter case the excess heat will require to be dissipated.

This pigment carrier liquid preparation hereinafter termed the carrier preparation is then added to a liquid or liquid mixture hereinafter termed the body preparation of relatively high viscosity which serves as the body of the paint such a liquid or liquid mixture being an oil or treated oils or oil and natural or synthetic resins ordinarily called a "varnish."

The carrier preparation and the body preparation are then intimately mixed in mixing apparatus of known type.

Instead of using a simple carrier liquid as aforesaid a liquid mixture rich in a liquid of low viscosity may be used so that the liquid itself has a low viscosity.

It will be seen that the invention enables a paint to be produced in which the pigment is uniformly dispersed and by a simplified process of manufacture insofar as the paint manufacturer is concerned since the production of pigment is a specialised industry and the invention permits the carrier preparation to be produced by the pigment manufacturer whilst the actual manufacture of the paint may be effected by the paint manufacturer using the carrier preparation supplied by the pigment manufacturer.

Although the invention has been described in its application to the manufacture of paints it should be understood that the invention is equally applicable to the manufacture of coloured plastics in which case the preparation of the pigment liquid carrier preparation is effected as in the embodiment first described and the carrier preparation subsequently intimately admixed with the selected plastic forming syrup or with the selected plasticised plastic or with the selected mixture of plasticised plastic and plasticiser to be used prior to the initiation of the action for the production of the desired plastic.

I claim:

1. The new or improved process for manufacturing paints comprising the steps of effecting the admixture of a powdered pigment and a carrier liquid of low viscosity, subjecting the mixture to ultrasonic vibrations to ensure a uniform dispersion of the pigment in the carrier liquid, reducing the product to a desired solids content by evaporation, then adding the preparation aforesaid in the required proportion to a liquid which is to constitute the body of the paint and which liquid is of relatively high viscosity, and subsequently effecting a mixture of the liquid pigment preparation of relatively low viscosity and the liquid of relatively high viscosity.

2. The new or improved process for manufacturing paints comprising the steps of effecting the admixture of a powdered pigment and a volatile carrier liquid of low viscosity such as xylene, subjecting the mixture to ultrasonic vibrations to ensure a uniform dispersion of the pigment in the carrier liquid, reducing the product to a desired solids concentration by evaporation of part of the carrier liquid utilising the heat produced in the action of the ultrasonic vibrations, then adding the preparation aforesaid in the required proportion to a varnish which is to constitute the body of the paint and subsequently effecting a mixing of the said liquid pigment preparation and the said varnish.

3. The new or improved process for manufacturing paints comprising the steps of effecting the wetting and admixture of a preparation of a powdered pigment in a body of carrier liquid of low viscosity by ultrasonic vibration and then mixing with a liquid of higher viscosity which is to constitute the body of the paint.

4. The new or improved process for manufacturing coloured plastics comprising the steps of effecting the admixture of a powdered pigment and a carrier liquid of low viscosity, subjecting the mixture to ultrasonic vibrations to ensure a uniform dispersion of the pigment in the carrier liquid, reducing the product to a desired solids content by evaporation, then adding the preparation aforesaid in the required proportion to a syrup which is to produce the required plastic and which syrup is of relatively high viscosity, and subsequently effecting the mixture of the liquid pigment preparation of relatively low viscosity and the syrup of relatively high viscosity.

5. The new or improved process for manufacturing coloured plastics comprising the steps of effecting an admixture and wetting of a preparation of a dispersion of a powdered pigment in a body of carrier liquid of low viscosity by ultrasonic vibration and then mixing with a syrup of higher viscosity which is to produce the required plastic.

MICHAEL HENRY MILLER ARNOLD.

References Cited in the file of this patent

UNITED STATES PATENTS

| Number | Name | Date |
| --- | --- | --- |
| 1,738,565 | Claypoole | Dec. 10, 1929 |
| 2,163,649 | Weaver | June 27, 1939 |
| 2,163,650 | Weaver | June 27, 1939 |
| 2,195,234 | Brown | Mar. 26, 1940 |
| 2,498,737 | Holden | Feb. 28, 1950 |
| 2,524,573 | Robinson | Oct. 3, 1950 |